United States Patent
Yang et al.

(10) Patent No.: US 11,233,688 B2
(45) Date of Patent: Jan. 25, 2022

(54) PHYSICAL DOWNLINK CONTROL CHANNEL (PDCCH) AGGREGATION LEVEL (AL) DESIGN FOR NEW RADIO (NR) ULTRA-RELIABLE LOW LATENCY COMMUNICATION (URLLC)

(71) Applicant: QUALCOMM Incorporated, San Diego, CA (US)

(72) Inventors: Wei Yang, San Diego, CA (US); Jing Sun, San Diego, CA (US); Seyedkianoush Hosseini, San Diego, CA (US); Jing Jiang, San Diego, CA (US); Wanshi Chen, San Diego, CA (US); Gabi Sarkis, San Diego, CA (US); Huilin Xu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/278,244

(22) Filed: Feb. 18, 2019

(65) Prior Publication Data
US 2019/0268206 A1     Aug. 29, 2019

Related U.S. Application Data

(60) Provisional application No. 62/634,710, filed on Feb. 23, 2018.

(51) Int. Cl.
*H04L 27/26* (2006.01)
*H04W 72/04* (2009.01)
(Continued)

(52) U.S. Cl.
CPC .......... *H04L 27/2666* (2013.01); *H04L 5/001* (2013.01); *H04L 5/0051* (2013.01);
(Continued)

(58) Field of Classification Search
CPC ... H04L 5/0057; H04L 5/0053; H04L 1/0038; H04L 5/001; H04L 25/0224;
(Continued)

(56) References Cited

U.S. PATENT DOCUMENTS

2018/0227156 A1*   8/2018   Papasakellariou .... H04L 5/0048
2019/0045533 A1*   2/2019   Chatterjee ......... H04W 72/0446
(Continued)

OTHER PUBLICATIONS

Intel Corporation: "On NR PDCCH Repetitions for URLLC", 3GPP Draft; R1-1802423 Intel—PDCCH Repetitions, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018 Feb. 17, 2018, XP051397948, Retrieved from the Internet: URL:http://www.3gpp.org/ftp/tsg%5Fran/WG1%5FRL1/TSGR1%5F92/Docs/ [retrieved on Feb. 17, 2018] section 3, 5 pages.
(Continued)

*Primary Examiner* — Oussama Roudani
(74) *Attorney, Agent, or Firm* — Patterson & Sheridan, L.L.P

(57) ABSTRACT

Certain aspects of the present disclosure relate to methods and apparatus for aggregation level (AL) design for physical downlink control channel (PDCCH) transmissions. New aggregation levels may be used in an effort to improve the reliability for PDCCH transmissions.

26 Claims, 9 Drawing Sheets

(51) Int. Cl.
*H04L 5/00* (2006.01)
*H04L 25/02* (2006.01)
*H04W 76/27* (2018.01)

(52) U.S. Cl.
CPC ........ *H04L 5/0053* (2013.01); *H04L 25/0224* (2013.01); *H04W 72/042* (2013.01); *H04W 72/0466* (2013.01); *H04W 76/27* (2018.02)

(58) Field of Classification Search
CPC ............ H04L 27/2666; H04W 72/042; H04W 72/048; H04W 72/0453; H04W 72/0446; H04W 72/0466; H04W 76/27
See application file for complete search history.

(56) References Cited

U.S. PATENT DOCUMENTS

| | | | | |
|---|---|---|---|---|
| 2019/0150073 A1* | 5/2019 | Tiirola | .................. | H04W 48/16 455/434 |
| 2020/0007295 A1* | 1/2020 | Kwak | ................. | H04W 72/042 |
| 2020/0008231 A1* | 1/2020 | Vilaipornsawai | ........................... | H04W 72/1273 |
| 2020/0021419 A1* | 1/2020 | Taherzadeh Boroujeni | ................ | H04L 5/0091 |
| 2020/0187236 A1* | 6/2020 | Moon | .................. | H04L 5/0044 |
| 2020/0351838 A1* | 11/2020 | Kim | ...................... | H04L 1/1854 |

OTHER PUBLICATIONS

Interdigital et al., "On PDCCH Transmission with high Reliability", 3GPP Draft; R1-1802576 (R15 NR WI AI 723 URLLC DCI Transmission), 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018, Feb. 16, 2018, XP051397485, Retrieved from the Internet: URL:http://www.3gpp.org/ftp/tsg%5Fran/WG1%5FRL1/TSGR1%5F92/Docs/ [retrieved on Feb. 16, 2018], Sections 2.3 and 2.4, 4 pages.

International Search Report and Written Opinion—PCT/US2019/018529—ISA/EPO—dated May 6, 2019.

LG Electronics: "Discussion on PDCCH Repetition for URLLC", 3GPP Draft; R1-1802227 Discussion on PDCCH Repetition for URLLC, 3rd Generation Partnership Project (3GPP), Mobile Competence Centre; 650, Route Des Lucioles; F-06921 Sophia-Antipolis Cedex; France, vol. RAN WG1, No. Athens, Greece; Feb. 26, 2018-Mar. 2, 2018 Feb. 16, 2018, XP051397232, Retrieved from the Internet: URL:http://www.3gpp.org/ftp/tsg%5Fran/WG1%5FRL1/TSGR1%5F92/Docs/ [retrieved on Feb. 16, 2018], Section 2.1 and 2.2, 4 pages.

Samsung: "On PDCCH Structure," 3GPP Draft; R1-1717641 on PDCCH Structure, 3rd Generation Partnership Project (3GPP), Mobile Competence Centre; 650, Route Des Lucioles; F-06921 Sophia-Antipolis Cedex; France, vol. RAN WG1, No. Prague, CZ; Oct. 9, 2017-Oct. 13, 2017, Oct. 8, 2017, XP051340827, pp. 1-7, Retrieved from the Internet: URL: http://www.3gpp.org/ftp/Meetings_3GPP_SYNC/RAN1/Docs/ [retrieved on Oct. 8, 2017], section 2.1.

* cited by examiner

PHYSICAL DOWNLINK CONTROL CHANNEL (PDCCH) AGGREGATION LEVEL (AL) DESIGN FOR NEW RADIO (NR) ULTRA-RELIABLE LOW LATENCY COMMUNICATION (URLLC)

CLAIM OF PRIORITY UNDER 35 U.S.C. § 119

The present application for patent claims benefit of U.S. Provisional Patent Application Ser. No. 62/634,710, filed Feb. 23, 2018, assigned to the assignee hereof and hereby expressly incorporated by reference herein.

FIELD

The present disclosure relates generally to communication systems, and more particularly, to methods for designing new aggregation levels (ALs) for the transmission of a Physical Downlink Control Channel (PDCCH). As described herein, the AL used for the PDCCH may be an AL that is not defined in a standard and therefore, may be used to achieve a higher reliability for a PDCCH transmission.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication by a network node such as a gNB. The method generally includes generating a physical downlink control channel (PDCCH) message for transmission at an aggregation level (AL), wherein the AL comprises a union of control channel elements (CCEs) in one or more search spaces within a control resource set (CORESET) and transmitting the PDCCH message to a user equipment (UE) at the AL.

Certain aspects provide a method for wireless communication by a user equipment (UE). The method generally includes receiving a physical downlink control channel (PDCCH) message at an aggregation level (AL), wherein the AL comprises a union of control channel elements (CCEs) in one or more search spaces within a control resource set (CORESET) and decoding the PDCCH message at the AL.

Aspects generally include methods, apparatus, systems, computer readable mediums, and processing systems, as substantially described herein with reference to and as illustrated by the accompanying drawings.

To the accomplishment of the foregoing and related ends, the one or more aspects include the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

Figure 1:
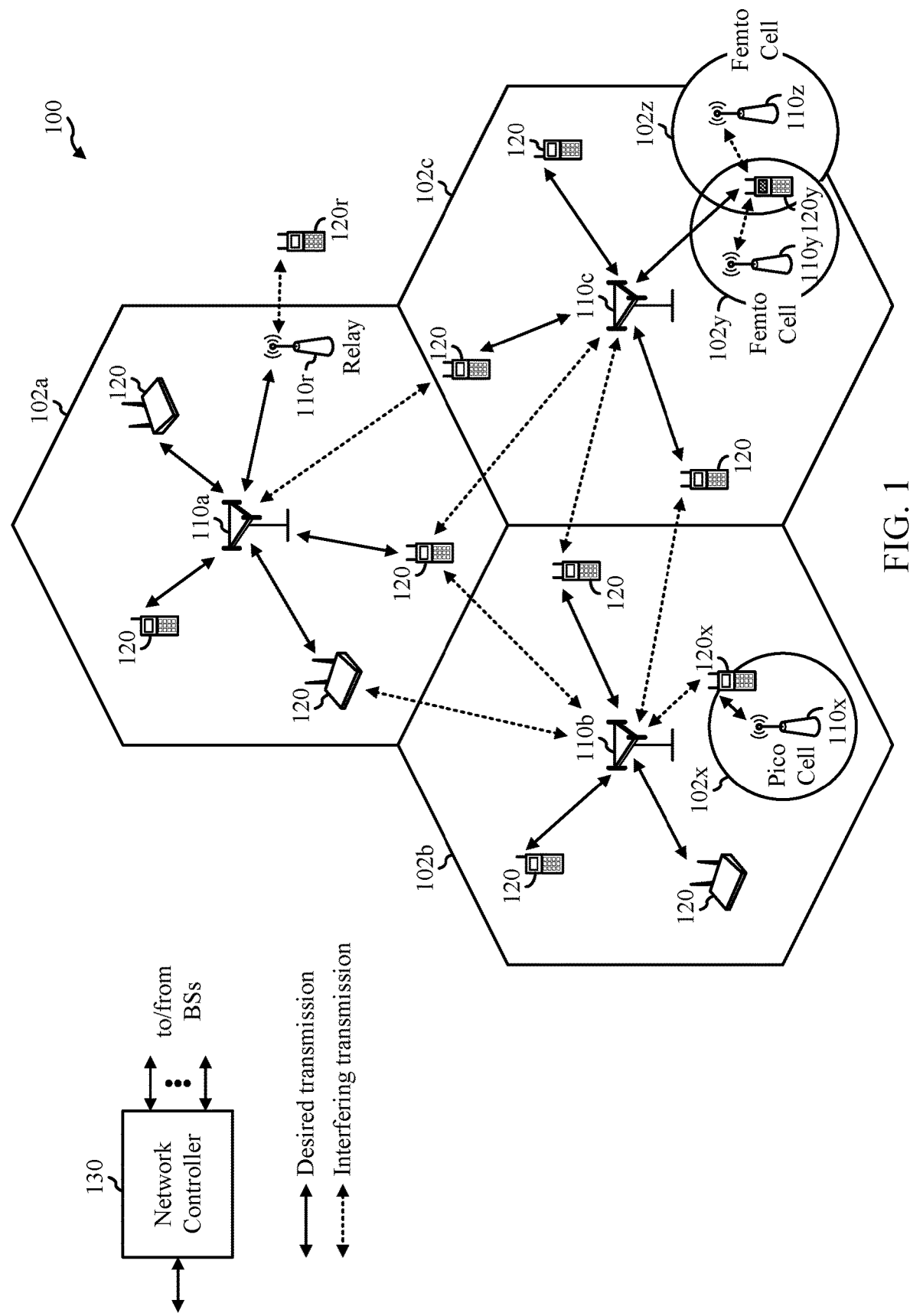
FIG. 1 is a block diagram conceptually illustrating an example telecommunications system, in accordance with certain aspects of the present disclosure.

To facilitate understanding, identical reference numerals have been used, where possible, to designate identical elements that are common to the figures. It is contemplated that elements described in one aspect may be beneficially utilized on other aspects without specific recitation. Aspects generally include methods, apparatus, systems, computer program products, computer-readable medium, and processing systems, as substantially described herein with reference to and as illustrated by the accompanying drawings.

DETAILED DESCRIPTION

Aspects of the present disclosure provide apparatus, methods, processing systems, and computer readable mediums for NR (new radio access technology or 5G technology).

NR may support various wireless communication services, such as Enhanced mobile broadband (eMBB) targeting wide bandwidth (e.g. 80 MHz beyond), millimeter wave (mmW) targeting high carrier frequency (e.g. 27 GHz or beyond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

To carry a PDCCH, multiple Control Channel Elements (CCEs) are used. An aggregation level (AL) defines the number of CCEs used for PDCCH transmission to a UE. Some wireless communication standards may define ALs for transmitting a PDCCH. As an example, NR Release-15 defines AL 1, 2, 4, 8, and 16.

There may be situations in which it may be desirable for a control message (e.g., NR physical downlink control channel (PDCCH) message) to be transmitted to a UE using an AL that is different than an AL defined in a standard. As an example, in URLLC, higher, different, or additional aggregation levels may be desirable in an effort to achieve higher reliability for PDCCH.

According to aspects of the present disclosure, new or additional ALs may be defined, outside of the ALs defined in a standard. As will be described in more detail herein, the ALs may be based on (time-frequency) resource availability and/or UE processing capability. The new AL includes a union of CCEs in one or more search spaces within a control resource set (CORESET) assigned to a UE. Additional aspects are provided which relate to the introduction of new ALs. These aspects include demodulation reference signal design, RRC configuration of the new AL, a type of downlink control information (DCI) format used with the new ALs, and ensuring a UE refrains from performing a number of blind decodes that exceeds a predefined threshold. The new ALs advantageously allow a UE to use additional CCEs (e.g., CCEs that may not have been previously used for PDCCH transmission) for reception of PDCCH subject to resource availability and processing capability. In this manner, resources may be efficiently used and the UE may have achieve a higher reliability for receiving a PDCCH.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed.

A network entity such as a BS 110 may transmit a PDCCH using an AL as described herein (e.g., not defined in a current version of a standard) and a UE 120 may receive and decode the PDCCH, by monitoring a search space for the AL based on a union of control channel elements (CCEs) for other AL search spaces, as described herein.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (e.g., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells may be configured as access cell (ACells) or data only cells (DCells). For example, the RAN (e.g., a central unit or distributed unit) may configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
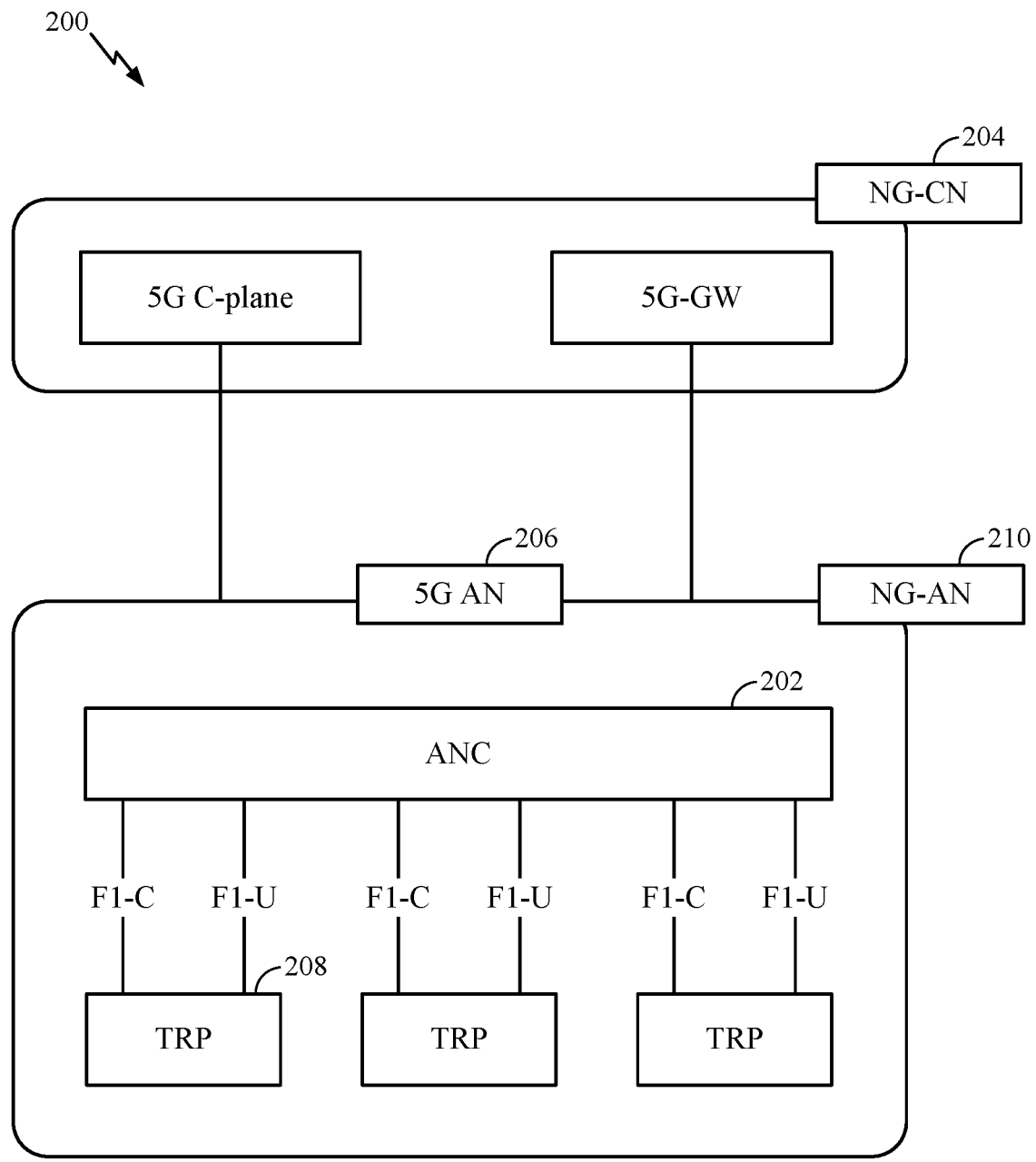
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
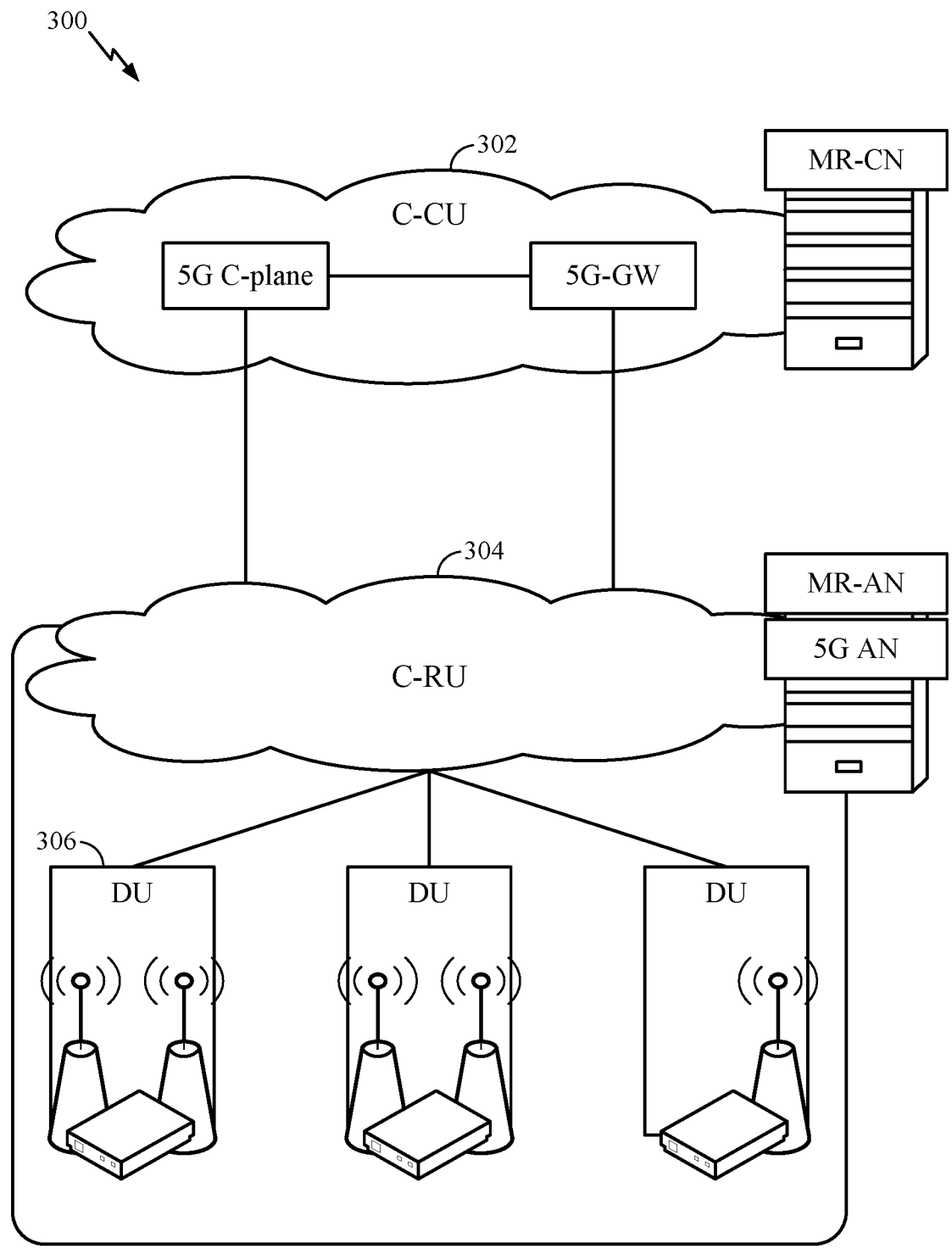
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
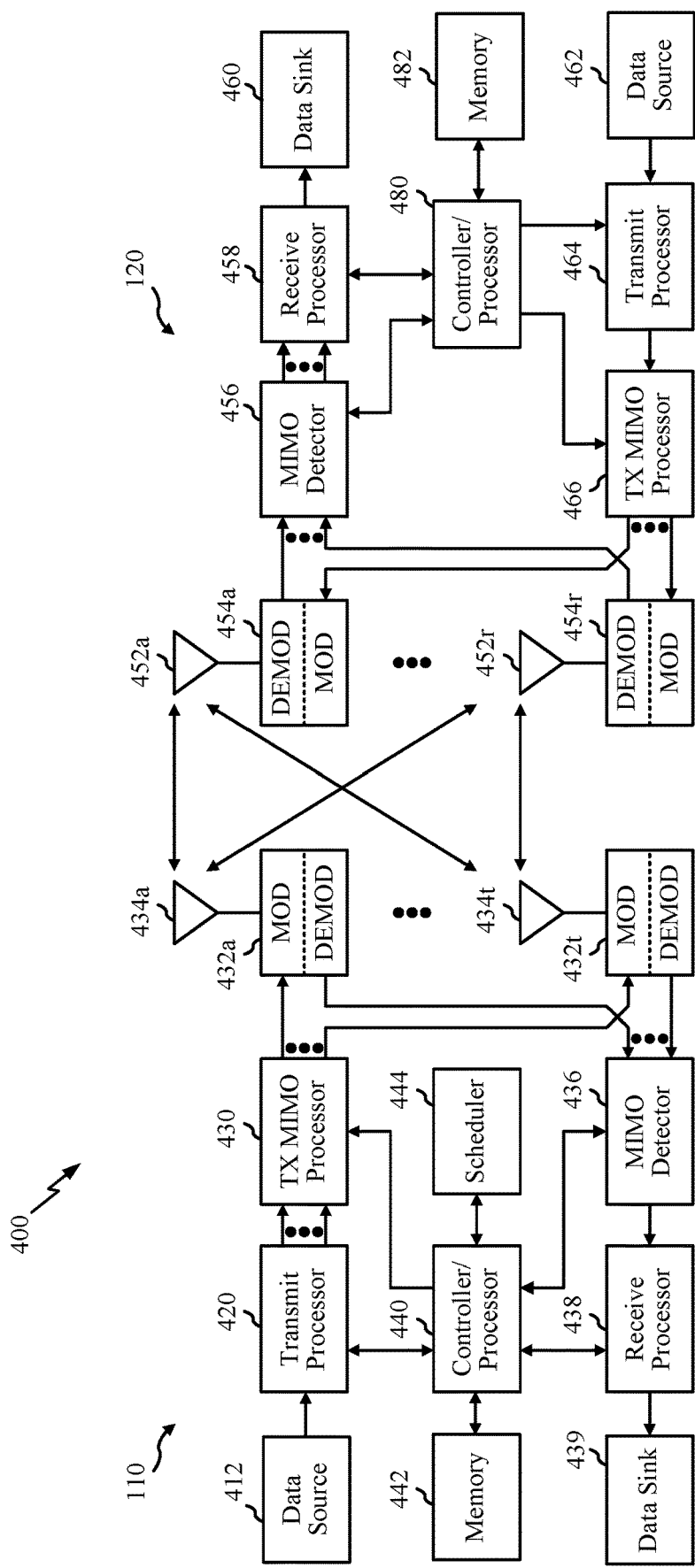
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9 and 10.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects may include providing the antennas, as well as some Tx/Rx functionalities, such that they reside in distributed units. For example, some Tx/Rx processings may be done in the central unit, while other processing may be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIG. 9 and/or other processes for the techniques described herein. The processor 480 and/or other processors and modules at the UE 120 may also perform or direct, e.g., the execution of the functional blocks illustrated in FIG. 10 and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
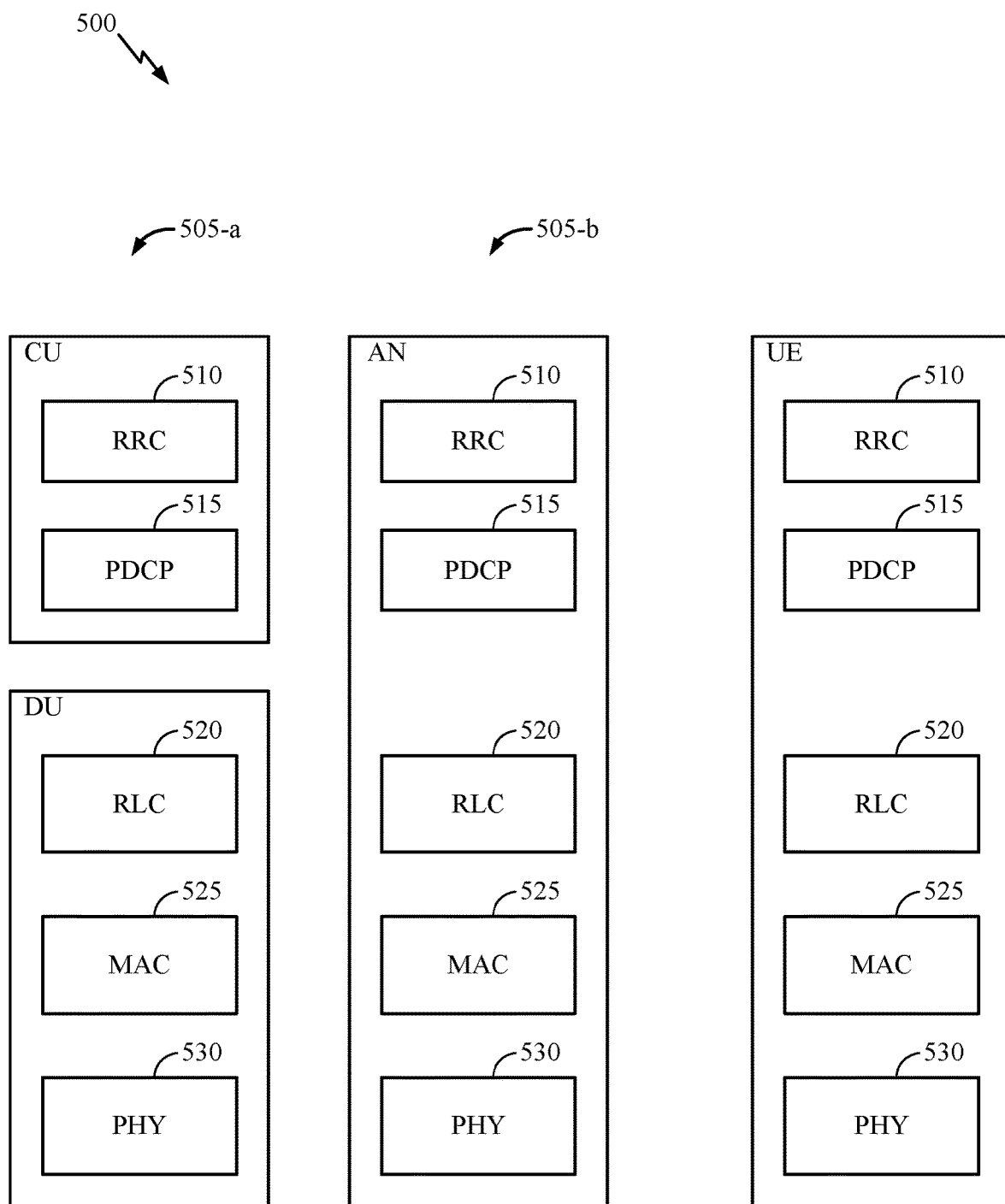
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
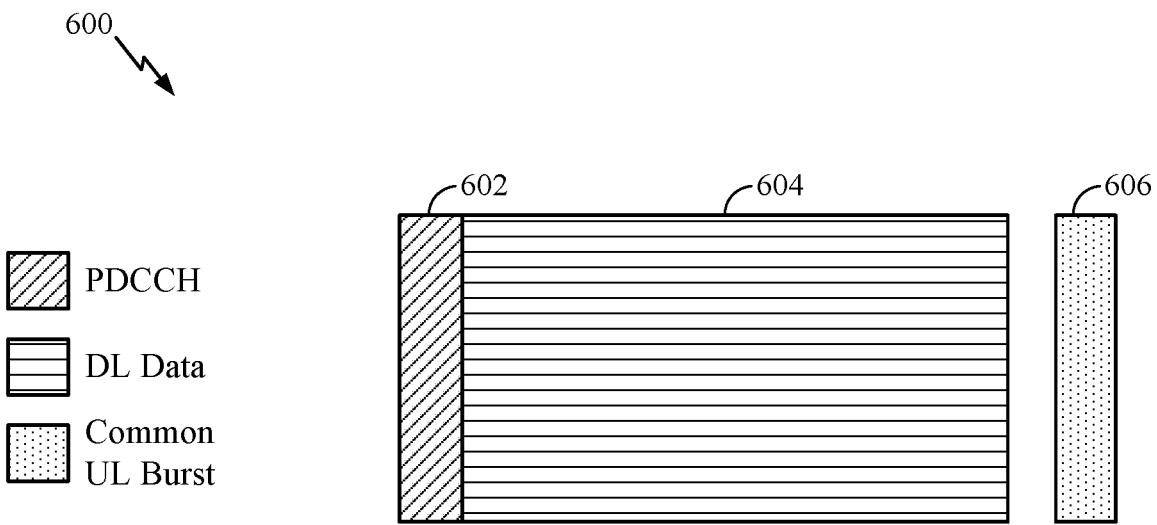
FIG. 6 illustrates an example of a DL-centric subframe, in accordance with certain aspects of the present disclosure.

FIG. 6 is a diagram 600 showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
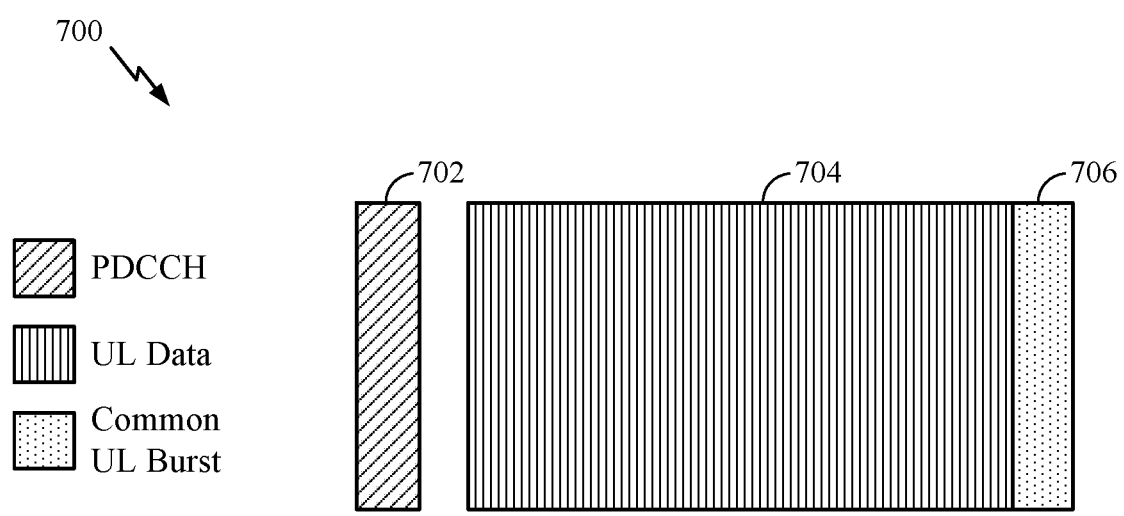
FIG. 7 illustrates an example of an UL-centric subframe, in accordance with certain aspects of the present disclosure.

FIG. 7 is a diagram 700 showing an example of an UL-centric subframe. The UL-centric subframe may include a control portion 702. The control portion 702 may exist in the initial or beginning portion of the UL-centric subframe. The control portion 702 in FIG. 7 may be similar to the control portion 602 described above with reference to FIG. 6. The UL-centric subframe may also include an UL data portion 704. The UL data portion 704 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 702 may be a physical DL control channel (PDCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 706. The common UL portion 706 in FIG. 7 may be similar to the common UL portion 606 described above with reference to FIG. 6. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In communication systems operating according to new radio (NR) (e.g., 5G) standards, one or more control resource sets (CORESET) for transmission of PDCCHs may be supported. A CORESET may include one or more control resources (e.g., time and frequency resources) configured for conveying PDCCH. Within each CORESET, one or more search spaces (e.g., common search space, UE-specific search space, etc.) may be defined for a given UE. A CORESET may be defined in units of resource element groups (REGs). Each REG may include a fixed number (e.g., twelve, or some other number) of tones in one symbol period (e.g., a symbol period of an OFDM symbol), where one tone in one symbol period is referred to as a resource element (RE). A fixed number of REGs may be included in a control channel element (CCE) (e.g., a CCE may include six REGs, or some other number of REGs).

A NR-PDCCH may occupy one or more NR-CCEs. For NR-PDCCH, different numbers of NR-CCEs may form the resource for downlink control information (DCI). The number of NR-CCEs in a NR-PDCCH generally refers to the NR-PDCCH's aggregation (AL). The AL generally configures the coverage of DCI and the amount of resource used for the DCI. Multiple sets of NR-CCEs may be defined as search spaces for UEs. For example, for NR-PDCCH, one or more search spaces may be defined, where each search space includes a set of decoding candidates with one or more aggregation levels. Thus, a gNB may transmit a NR-PDCCH to a UE by transmitting the NR-PDCCH in a set of CCEs that is defined as a decoding candidate within a search space for the UE. Likewise, the UE may receive the NR-PDCCH by searching in search spaces for the UE and decoding the NR-PDCCH transmitted by the gNB.

Example PDCCH AL Design

As described above, a CORESET includes the set of potential resources that can be used for PDCCH transmission. In an example, a CORESET set may contain 100 CCEs, e.g., CCEs {0 . . . 99}. The CCE indices are logical indices and a specific logical-to-physical mapping function conveys to the UE where to find CCE k.

One or more search spaces may exist within a UE's CORESET. For each UE, NR defines a common search space (CSS) and one or more UE-specific search spaces (USS). A CSS is used for control information that is to be sent to multiple UEs. A USS includes CCEs that are used to send information to a particular UE. For USSs, each search space is tied with one PDCCH AL. As an example, all PDCCH candidates of AL 4 form one search space. Search spaces may overlap. Accordingly, any portion of one or more USSs and the CSSs may have overlapping CCEs.

A UE performs channel estimation and demodulation for all CCEs in all configured search spaces for blind detection of a PDCCH. Due to UE hardware limitations, the UE may not be able to process all CCEs within the CORESET. UE processing capability refers to how many CCEs the UE is able to process (e.g., perform channel estimation) in a time slot or one PDCCH monitoring occasion based, at least in part, on hardware conditions. According to current wireless standard agreements, a network node ensures search spaces are within a UE's processing capability. If a search space is outside of the UE's processing capability, the UE is not required to decode the information contained in the resources.

As described herein, new AL(s) are designed and defined which allow a UE to use more CCEs, subject to resource (e.g., CCE) availability and UE processing capability. Advantageously, the new ALs allow a UE to use more, additional, and/or different CCEs for PDCCH transmission/reception in an effort to increase reliability for a UE receiving a PDCCH (e.g. as compared to only being able to use the pre-defined ALs). As will be described in more detail below, the new AL(s) may be formed based on a union of CCEs in one or more search spaces and/or may include all CCEs within the UE's processing capability within the UE's CORESET.

Figure 8:
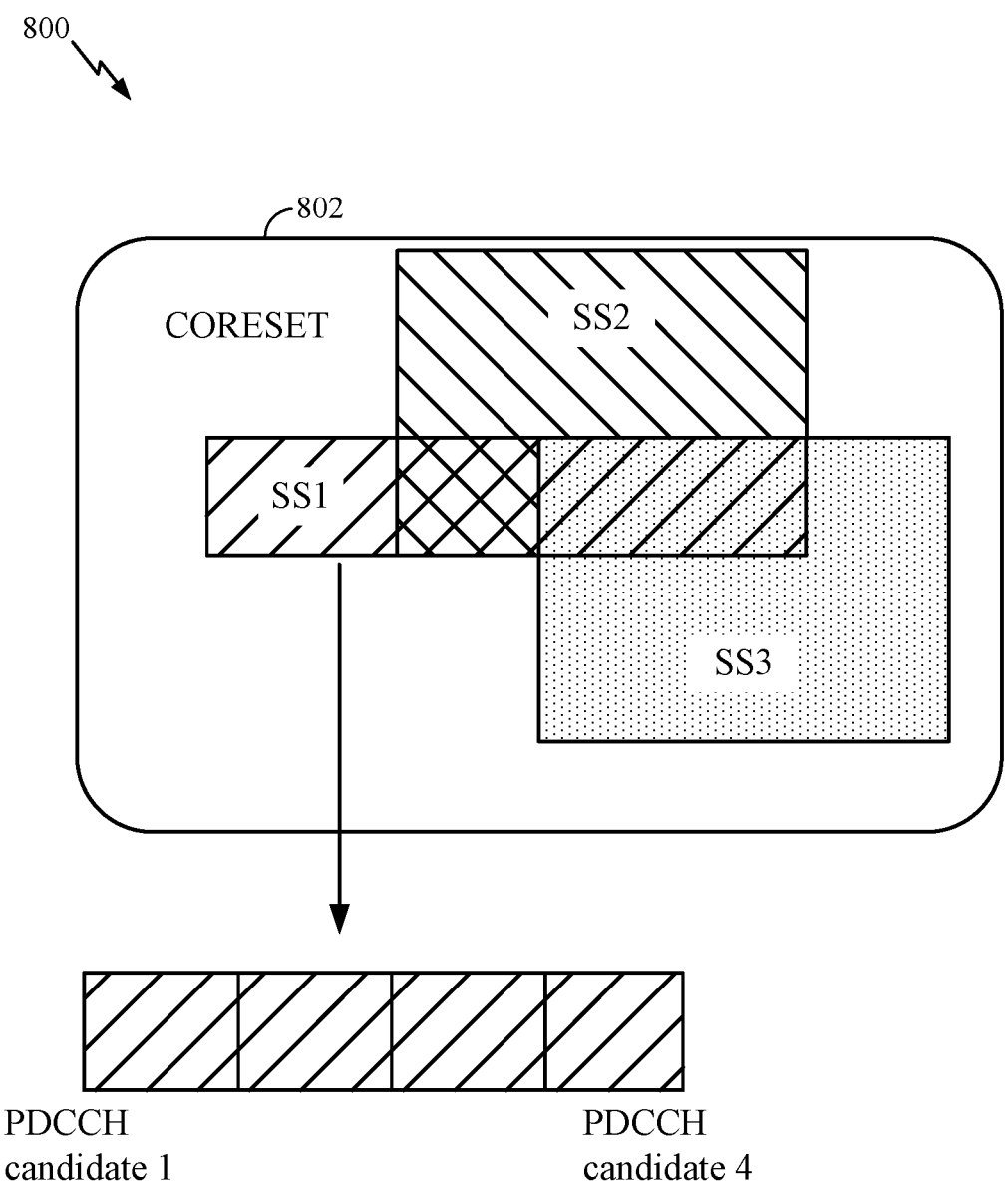
FIG. 8 illustrates an example of a CORESET including multiple search spaces.

FIG. 8 illustrates an example 800 of a CORESET including multiple search spaces (SSs). Three search spaces are illustrated in the CORESET 802. SS1 and SS2 may be USSs for a particular UE and SS3 may be a CSS. A search space, such as SS1, may include 4 PDCCH candidates. Each PDCCH candidate contains a number of CCEs. As illustrated, a portion of SS1, SS2, and SS3 overlap; however, the overlap of SSs may be more or less than illustrated in FIG. 8.

In an example, a UE is configured with a CSS, USS1, USS2, . . . , USSK, where ALs for USSs are $L\_1 < L\_2 < . . . < L\_K$. In accordance with the present disclosure, a new AL is defined that includes the union of CCEs in one or more of the SSs within one CORESET. The new AL is defined by the union of CCEs in one or more search spaces, in part, due overlapping SSs, wherein one or more CCEs may be part of multiple SSs. As SSs may be overlapping, the union of CCEs, instead of the sum of CCEs is used to define or characterize the AL.

According to a first option, SSs are combined based on a scrambling ID. Each PDCCH has a scrambling sequence (the sequence is generated using one ID). The scrambling sequence is used to scramble the encoded PDCCH data and the demodulation reference signal (DMRS) of the PDCCH transmission. In NR, different scrambling IDs may be used for the CSS and the USSs. As multiple UEs receive the PDCCH in the CSS, an ID specific for a gNB may be used to scramble the PDCCH in the CSS. Because a USS is UE-specific, a UE-specific ID may be used for the scrambling of the PDCCH transmitted in the USS. Accordingly, a possibility exists where different scrambling IDs are used for transmitting the PDCCH in the CSS and the USS.

If the scrambling ID of USSs and CSS are the same, then all CCEs in the union of all SSs (CSS and USSs) may be combined to form an AL having one PDCCH decoding candidate. If the PDCCH transmitted in the CSS and USSs are scrambled by different IDs, then all CCEs in the union of all USSs may be combined to form one PDCCH decoding candidate and all CCEs in the CSS can be combined to form another PDCCH decoding candidate.

Thus, in one example, search spaces may be combined based on scrambling IDs to define a new AL. The AL will equal the size (e.g., number of CCEs) of the union of the CCEs in the SSs of the CORESET having a same scrambling ID for the PDCCH. USSs for a particular UE may use the same scrambling ID. If the CSS also uses that same scrambling ID as used in the USS, then the AL is the union of all CCEs in all SSs within the CORESET. If the USSs and the CSS use different scrambling IDs, then a first new (additional) AL is the number of CCEs in the CSS and another new (additional) AL is the union of CCEs in the USSs.

According to an aspect, instead of combining SS based on a scrambling ID, the SS may be combined based on the type of search space, e.g., whether the SS is a USS or a CSS. All CCEs in the union of the USSs may form an AL. All CCEs in the CSS may be used to form another AL.

According to an aspect, CCEs in one or more SSs are combined based on an AL. In one example, all CCEs in one USS having a same AL (e.g., $SS_K$) may be combined to form one, larger AL. For illustrative purposes, all USS having an AL 4 may form one new AL. In another option of forming a union of CCEs based on existing ALs, all CCEs in the union of multiple (e.g., two or more) USSs define an AL (e.g., $SS_K \cup SS_{K-1}$). Therefore the union of one USS having an AL k ($SS_K$) and another USS having an AL k+1 ($SS_{K+1}$) may form a new AL. Advantageously, the union of CCEs from multiple USS will use the same scrambling ID for the PDCCH.

According to an aspect, the union of SSs that define the new AL may exclude CCEs included in the CSS. Because SSs are overlapping, the new AL may use only CCEs in the USSs and not in the CSS. In one example, the new AL includes the union of all CCEs in the USSs and excludes any of those CCEs which are part of the CSS. In another example, the new AL includes the union of CCEs having a same AL as defined by a standard and excludes any CCEs which may be part of the CSS.

Turning to UE processing capability, a UE may be limited with respect to how many CCEs the UE may process in a time slot. Currently, a network node configures the SS such that it does not exceed a UE's processing capability.

The new AL may include the union of CCEs the UE can process within one CORESET. In other words, the AL may include the union of CCEs that the UE is performing channel estimation for within one CORESET.

The gNB and the UE may agree on a rule to perform CCE pruning (dropping certain CCEs) in scenarios when the number of CCEs in the CORESET exceeds the UE processing capability. Accordingly, if a CORESET size is 60 and a UE has a processing capability to perform channel estimation on 48 CCEs, the rule may specify which 48 CCEs to use within the CORESET of 60 CCEs. The AL may include the union of CCEs the UE can process within on CORESET and may include only CCEs whose demodulation reference signal (DMRS) for the PDCCH are scrambled by a same ID.

According to aspects, the new ALs may be greater than 16 (the highest AL defined in NR Rel-15). According to aspects, the AL may be smaller than 16, for example, when the gNB may not configure enough resources from the CORESET to form an AL greater than 16. In some cases, the AL may not be a power of 2. As an example, the AL may be 12.

Given the new ALs, other considerations associated with DMRS, configuring a PDCCH candidate, DCI formats, and UE blind decodes may be necessary.

A DMRS may be used to estimate a channel for PDCCH and then for demodulation of the PDCCH. Each PDCCH is associated with its own UE-specific DMRS. gNBs have multiple antennas and may use beamforming to point reference signals to different UEs. A UE may not perform channel estimation on the DMRS that is aimed to other UEs, instead, the UE should perform channel estimation on the DMRS aimed for/directed to itself. However, because a UE may not know a priori which CCE will be used to convey its PDCCH, the UE performs blind detection. Because of the blind detection, there is a possibility that two consecutive CCEs may be used to transmit a PDCCH for two different UEs, and the UE may not perform channel estimation jointly on these two CCEs.

Because the UE may not perform channel estimation across CCEs (since different CCEs may contain RSs for different UEs having different beamforming directions/precoders), according to aspects, the UE may only perform channel estimation once for each CCE. The UE may not perform separate channel estimation for each AL or each blind decode. This may limit channel estimation performance as well as number of blind decodes that the UE may perform.

According to another aspect, a wideband RS may be used, where the DMRS for the PDCCH spans the entire CORESET bandwidth with the same precoder whenever there is PDCCH transmission. The gNB may not perform UE-specific beamforming for the DMRS that spans the entire bandwidth of the CORESET. Wideband DMRS may enhance the UE's channel estimation performance.

Currently, a gNB will configure a UE's CORESET and multiple SSs in the CORESET. Therefore, in accordance with aspects of the present disclosure, the UE is RRC configured with new ALs in addition to the regular (standards-defined) PDCCH candidates within each search space.

Currently, a search space is defined by the RRC-configured parameters: AL, number of candidates for this AL, and the PDCCH monitoring occasion. The new AL(s) may be configured by adding a new parameter (e.g., AL_max) to the existing RRC-configured parameters. According to aspects, a pre-agreed rule may exist between the UE and the gNB regarding which SSs to combine to determine a union of CCEs. By definition, only one decoding candidate for this AL exists. According to aspects, multiple new ALs may exist. Parameters e.g., AL_max1, AL_max2 may be used to configure the new ALs. Each of the new ALs may correspond to a pre-agreed rule to determine the union of CCEs as we discussed in this application The new AL may be used with a regular DCI format (e.g., DCI format agreed in NR Rel-15). DCI format is a pre-defined format in which the downlink control information is packed/formed and transmitted in PDCCH message. DCI is the information conveyed in the control channel before channel coding. NR supports several formats, called regular DCI formats. To further increase the reliability of PDCCH in NR, a new DCI format, that is much more compact (i.e., with a smaller payload size) than regular DCI, is introduced. The new ALs are compatible with both the NR Rel-15 DCI formats and the compact DCI format.

A gNB needs to guarantee that the number of blind decodes performed by the UE does not exceed a pre-agreed value M. This value may be the same as in the case where the new AL is not introduced. The number of blind decodes may be restricted by using the new AL only for certain DCI format(s) (e.g., regular DCI formats agreed in NR Rel-15, or compact DCI). In an aspect, the number of blind decodes may be restricted by reducing the configured PDCCH candidates for each AL. In an example, if the UE is configured for 4 candidates for AL 1 for decoding the PDCCH, and a new AL is used, then the number of decoding candidates for the regular AL may be reduced from 4 to 3. The number of blind decodes may be reduced by defining a rule, indicating to the UE, which blind decoding candidates to drop when the number of blind decodes exceeds a threshold value M. In an example, the new AL may be enabled only when decoding the new AL would not exceed the UE's blind decoding budget. Otherwise, the new AL may be dropped.

Figure 9:
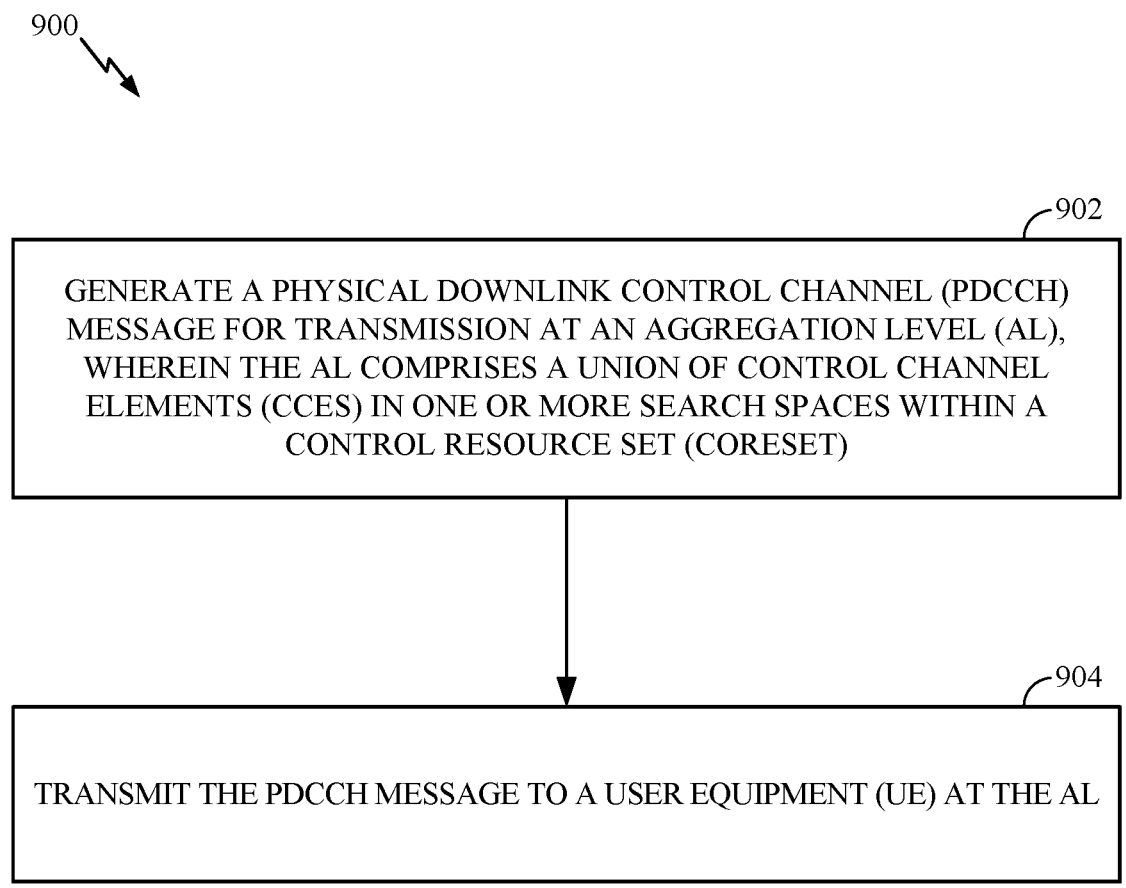
FIG. 9 illustrates example operations for wireless communications performed by a network node, in accordance with certain aspects of the present disclosure.

FIG. 9 illustrates example operations 900 for wireless communications, in accordance with aspects of the present disclosure. Operations 900 may be performed, for example, by a network node (e.g., a gNB), such as BS 110 shown in FIG. 1.

Operations 900 begin, at 902, where the network node generates a physical downlink control channel (PDCCH) message for transmission at an aggregation level (AL), wherein the AL comprises a union of control channel elements (CCEs) in one or more search spaces within a control resource set (CORESET). At 904, the network node transmits the PDCCH message to a user equipment (UE) at the AL.

The UE performs complementary operations as the network node to decode the PDCCH transmitted in this manner.

Figure 10:
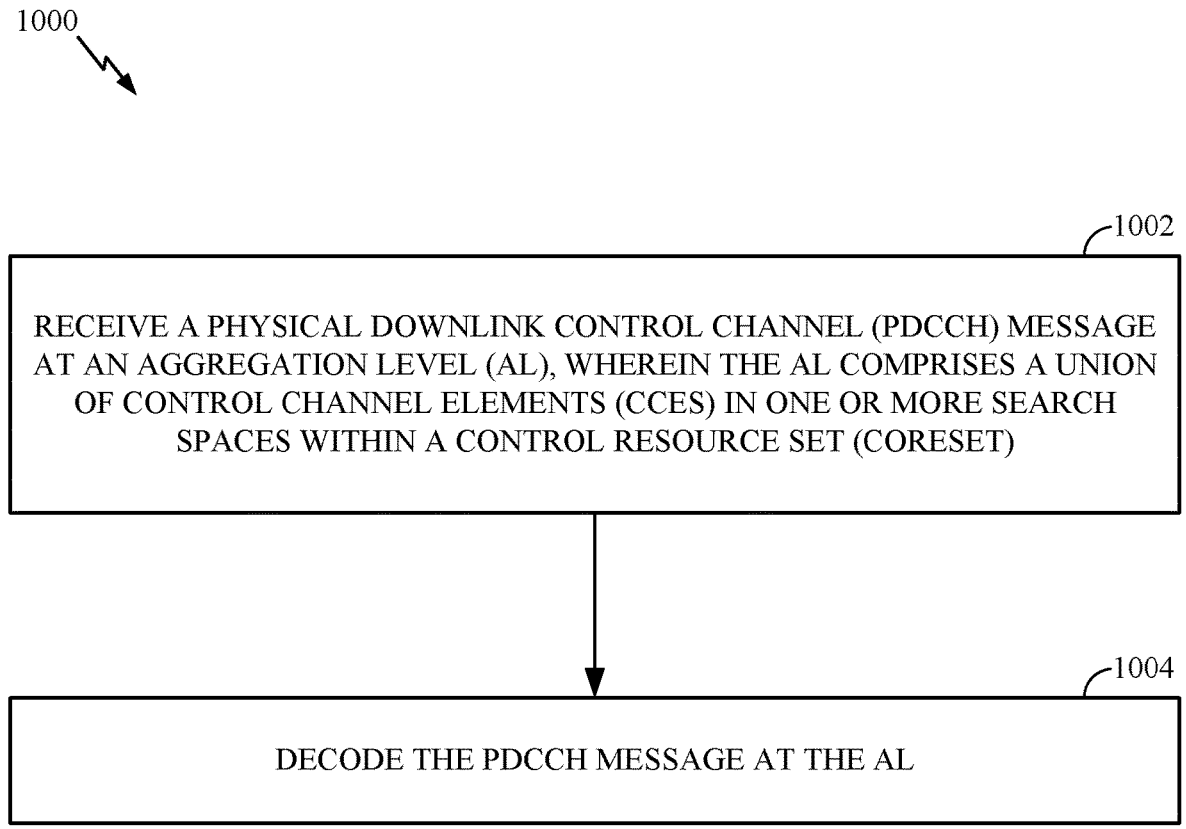
FIG. 10 illustrates example operations for wireless communications performed by a user equipment, in accordance with certain aspects of the present disclosure.

For example, FIG. 10 illustrates example operations 1000 a UE, such as UE 120 shown in FIG. 1, may perform to decode a PDCCH transmitted according to operations 900 described above.

Operations 1000 begin, at 1002, where the UE receives a physical downlink control channel (PDCCH) message at an aggregation level (AL), wherein the AL comprises a union of control channel elements (CCEs) in one or more search spaces within a control resource set (CORESET). At 1004, the UE decodes the PDCCH message at the AL.

As described above, search spaces in the UE's CORESET may be combined based on a scrambling ID used for the PDCCH. In one example, the union of CCEs includes the union of all CCEs in one or more SSs in the CORESET having a same PDCCH scrambling identification. The SSs includes USSs and a CSS. The network node may transmit the PDCCH scrambled using the scrambling ID at the new AL and the UE may decode the PDCCH at the new AL using the scrambling ID. In one example, the union may include the union of CCEs in one or more USSs and the CSS in the UE's CORESET that are associated with a same PDCCH scrambling ID.

As described above, in certain scenarios, the union of CCEs includes the union of all CCEs in all of the USSs in UE's CORESET. Further, due to potential differences in scrambling IDs, the union may exclude any CCEs included in the union of CCEs of the USS that are also part of the CSS. In this manner, the union excludes all CCEs in the CSS of the UE's CORESET.

In an example, the union of CCEs includes all CCEs in a CSS.

According to yet another example, the union of CCEs includes all CCEs in a first USS having a same AL. This union may further exclude any of the CCEs in the USS having a same AL that are also included in the CSS. The union may include a union of all CCEs in the first USS having a same AL and all CCEs in a second USS having a second AL (again, the union may exclude the CCEs in the first and second USS that overlap with the CSS.) The union of these CCEs may form the new AL.

In another example, the union is based on the UE's processing capability. The union includes all CCEs within the CORESET on which the UE performs channel estimation. In an example, the union of CCEs comprises all CCEs within the UE's CORESET on which the UE performs channel estimation and all CCEs on which the DMRS for the PDCCH are scrambled by the same scrambling ID.

The new AL may be greater than a current maximum AL defined in a standard (e.g., 16). However the new AL may be smaller than such a maximum AL if the network node does not (or may not be able to) configure enough CCEs in the CORESET for a higher AL.

According to aspects, a DMRS for the PDCCH may be transmitted using a same beamforming precoder, wherein the DMRS spans the entire bandwidth associated with the UE's CORESET.

In another example, the UE may be configured to refrain from decoding the PDCCH at the new AL when decoding the new AL would exceed the UE's decoding budget (e.g., max number of decodes M). The AL may be used based on the type or size of DCI. The type and/or size of DCI may be DCI as defined in NR Rel-15, or any other standard, or a compact DCI.

Thus, as described herein, ALs, in addition to the ALs defined in a standard, may be used in an effort to increase PDCCH reception reliability.

The methods described herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items may be employed by itself, or any combination of two or more of the listed items may be employed. For example, if a composition is described as containing components A, B, and/or C, the composition may contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing described herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components. For example, processors 460, 420, 438, and/or controller/processor 440 of the BS 110 may be configured to perform operations 099 of FIG. 9, while processors 466, 458, 464, and/or controller/processor 480 of the UE 120 may be configured to perform operations 1000 of FIG. 10.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may include a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may include a single instruction, or many instructions, and may be distributed over several different code segments, among different programs, and across multiple storage media. The computer-readable media may include a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may include non-transitory computer-readable media (e.g., tangible media). In addition, for other aspects computer-readable media may include transitory computer-readable media (e.g., a signal). Combinations of the above should also be included within the scope of computer-readable media.

Thus, certain aspects may include a computer program product for performing the operations presented herein. For example, such a computer program product may include a computer-readable medium having instructions stored (and/or encoded) thereon, the instructions being executable by one or more processors to perform the operations described herein. For example, instructions for performing the operations described herein and illustrated in FIGS. 9 and 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
   receiving a single physical downlink control channel (PDCCH) message at an aggregation level (AL), wherein the AL comprises a union of control channel elements (CCEs) in a plurality of search spaces within a control resource set (CORESET) in which the single PDCCH message can be carried;
   receiving radio resource control (RRC) signaling of a parameter indicating a value of the AL;
   determining, based on the indicated value of the AL and a predetermined rule, which of the plurality of search spaces within the CORESET to combine to determine the union of CCEs; and
   decoding the single PDCCH message at the AL.

2. The method of claim 1, wherein:
   the union of CCEs comprises a union of all CCEs in search spaces having a same PDCCH scrambling identification, and
   decoding the PDCCH at the AL comprises decoding using the scrambling identification.

3. The method of claim 2, wherein the plurality of search spaces comprise UE-specific search spaces (USSs) and a common search space (CSS).

4. The method of claim 1, wherein the union of CCEs comprises:
   a union of all CCEs in UE-specific search spaces (USSs) associated with the UE;
   a union of all CCEs in a common search space (CSS); or
   all CCEs in a first UE-specific search spaces (USS) having a same AL.

5. The method of claim 4, wherein the union of all CCEs in the USSs associated with the UE excludes all CCEs in the common search space associated with the UE.

6. The method of claim 4, wherein the union of CCEs excludes CCEs in a common search space (CSS) associated with the UE which are part of the first USS having the same AL.

7. The method of claim 4, wherein the union of CCEs further comprises a union of all CCEs in the first USS and all CCEs in a second USS, wherein the AL of the first USS is different than an AL associated with the second USS.

8. The method of claim 1, wherein the union of CCEs comprises all CCEs within the CORESET on which the UE performs channel estimation.

9. The method of claim 8, wherein the union of CCEs comprises all CCEs within the CORESET on which the UE performs channel estimation and all CCEs on which the demodulation reference signal (DMRS) for the PDCCH are scrambled by a same scrambling ID.

10. The method of claim 1, further comprising:
    receiving a demodulation reference signal (DMRS) for the PDCCH, wherein the DMRS spans an entire bandwidth associated with the CORESET and is transmitted to the UE using a same precoder; and
    performing channel estimation on the DMRS.

11. The method of claim 1, wherein decoding the PDCCH message at the AL comprises decoding a single decoding candidate associated with the AL.

12. A method for wireless communications by a network entity, comprising:
    generating a single physical downlink control channel (PDCCH) message for transmission at an aggregation level (AL), wherein the AL comprises a union of control channel elements (CCEs) in a plurality of search spaces within a control resource set (CORESET) in which the single PDCCH message can be carried;
    transmitting to a user equipment (UE), via radio resource control (RRC) signaling, a parameter indicating a value of the AL;
    determining, based on the indicated value and a predetermined rule, which of the one or more search spaces within the CORESET to combine to determine the union of CCEs; and
    transmitting the single PDCCH message to the UE at the AL.

13. The method of claim 12, wherein:
    the union of CCEs comprises a union of all CCEs in search spaces having a same PDCCH scrambling identification, and
    transmitting the PDCCH at the AL comprises transmitting using the scrambling identification.

14. The method of claim 13, wherein the plurality of search spaces comprise UE-specific search spaces (USSs) and a common search space (CSS).

15. The method of claim 12, wherein the union of CCEs comprises:
    a union of all CCEs in all UE-specific search spaces (USSs) associated with the UE;
    a union of all CCEs in a common search space (CSS); or all CCEs in a first UE-specific search spaces (USS) having a same AL.

16. The method of claim 15, wherein the union of all CCEs in all USSs associated with the UE excludes all CCEs in the common search space associated with the UE.

17. The method of claim 15, wherein the union of CCEs excludes CCEs in a common search space (CSS) associated with the UE which are part of the first USS having the same AL.

18. The method of claim 15, wherein the union of CCEs further comprises a union of all CCEs in the first USS and all CCEs in a second USS, wherein the AL of the first USS is different than an AL associated with the second USS.

19. The method of claim 12, wherein the union of CCEs comprises all CCEs within the CORESET on which the UE performs channel estimation.

20. The method of claim 12, wherein the union of CCEs comprises all CCEs within the CORESET on which the UE performs channel estimation and all CCEs on which the demodulation reference signal (DMRS) for the PDCCH are scrambled by a same scrambling ID.

21. The method of claim 12, further comprising:
transmitting a demodulation reference signal (DMRS) for the PDCCH using a same precoder, wherein the DMRS spans an entire bandwidth associated with the CORESET.

22. The method of claim 12, further comprising:
configuring the UE to refrain from decoding the PDCCH at the AL when decoding the PDCCH at the AL would exceed a threshold number of decodes.

23. The method of claim 12, the PDCCH at the AL is generated based, at least in part, on a size or format of a downlink control information (DCI) format of the PDCCH.

24. The method of claim 12, wherein decoding the PDCCH message at the AL comprises decoding a single decoding candidate associated with the AL.

25. An apparatus for wireless communications by a user equipment (UE), comprising:
means for receiving a single physical downlink control channel (PDCCH) message at an aggregation level (AL), wherein the AL comprises a union of control channel elements (CCEs) in a plurality of search spaces within a control resource set (CORESET) in which the single PDCCH message can be carried;
means for receiving radio resource control (RRC) signaling of a parameter indicating a value of the AL;
means for determining, based on the indicated value of the AL and a predetermined rule, which of the plurality of search spaces within the CORESET to combine to determine the union of CCEs; and
means for decoding the single PDCCH message at the AL.

26. An apparatus for wireless communications by a network entity, comprising:
means for generating a single physical downlink control channel (PDCCH) message for transmission at an aggregation level (AL), wherein the AL comprises a union of control channel elements (CCEs) in a plurality of search spaces within a control resource set (CORESET) in which the single PDCCH message can be carried;
means for transmitting to a user equipment (UE), via radio resource control (RRC) signaling, a parameter indicating a value of the AL;
means for determining, based on the indicated value and a predetermined rule, which of the one or more search spaces within the CORESET to combine to determine the union of CCEs; and
means for transmitting the single PDCCH message to the UE at the AL.

* * * * *